July 3, 1923.  1,460,836
S. F. ARBUCKLE
GLASS MOLD BURNISHING PROCESS AND APPARATUS
Filed Nov. 15, 1922  2 Sheets-Sheet 1
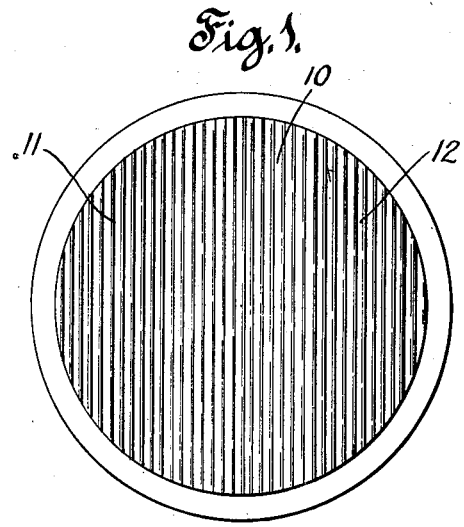
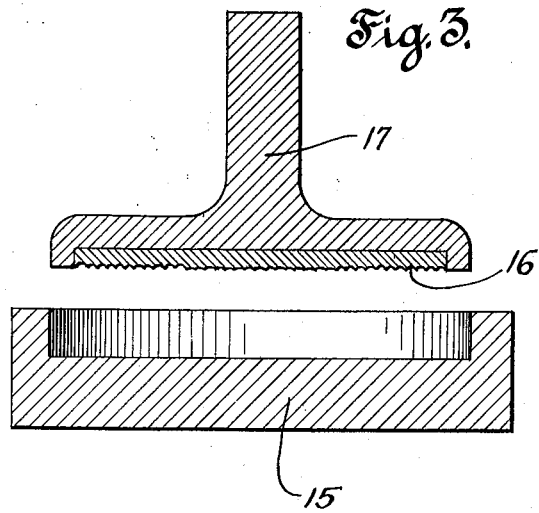
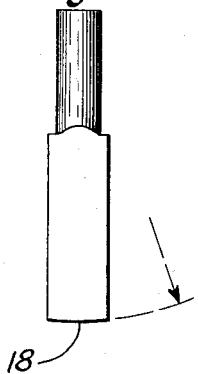
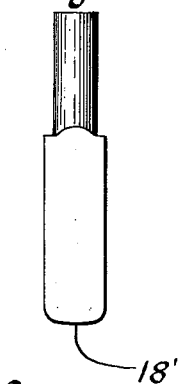
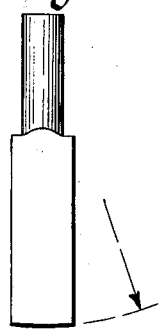
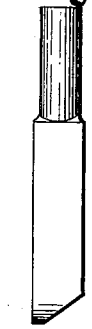
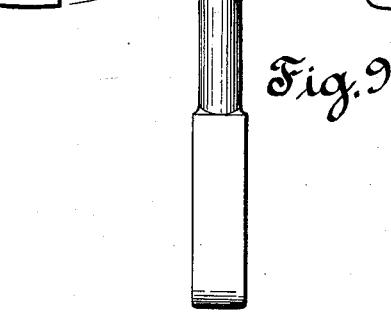
INVENTOR
Samuel F. Arbuckle
BY
Chester H Braselton
ATTORNEY July 3, 1923.
S. F. ARBUCKLE
1,460,836
GLASS MOLD BURNISHING PROCESS AND APPARATUS
Filed Nov. 15, 1922    2 Sheets-Sheet 2
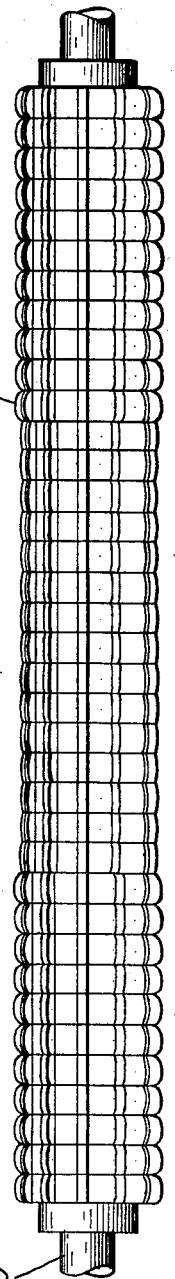
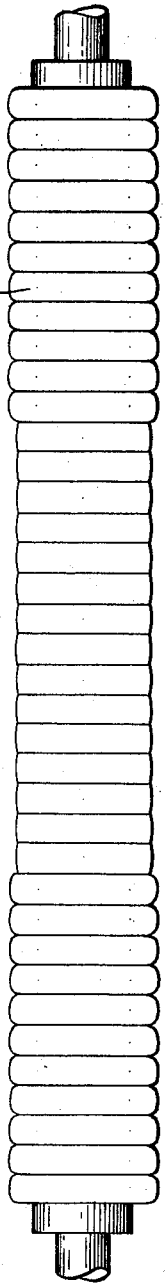
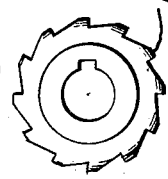
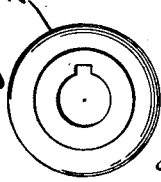
INVENTOR
Samuel F. Arbuckle
BY
Chester H. Braselton
ATTORNEY Patented July 3, 1923.

1,460,836

UNITED STATES PATENT OFFICE.

SAMUEL F. ARBUCKLE, OF DETROIT, MICHIGAN, ASSIGNOR TO MONOGRAM LENS CORPORATION, OF NEW YORK, N. Y., A CORPORATION OF DELAWARE.

GLASS-MOLD BURNISHING PROCESS AND APPARATUS.

Application filed November 15, 1922. Serial No. 601,002.

*To all whom it may concern:*

Be it known that I, SAMUEL F. ARBUCKLE, a citizen of the United States, residing at Detroit, in the county of Wayne and State of Michigan, have invented certain new and useful Improvements in Glass-Mold Burnishing Processes and Apparatus, of which I declare the following to be a full, clear, and exact description.

The present invention relates to a process and an apparatus for making, maintaining and reconditioning molds for producing glass articles such as headlight lenses in order to produce a uniform product in large quantity production.

An object of the present invention is to provide a process and apparatus for efficiently producing and continuously maintaining accurate a mold for making glass headlights or glass ribbed plates where an accurate configuration of a predetermined construction of ribs, lenses, grooves and the like is essential. Difficulty is experienced in accurately producing ribbed glass by molding operations in quantities due to the scale and other impurities forming on the surfaces of the mold after use any length of time. By the present invention, I provide a method and means for readily and accurately manufacturing and subsequently accurately reconditioning and maintaining a glass mold by providing an accurate master cutting tool and a similarly accurate mold burnishing tool of a configuration corresponding to the ribs, prisms or lenses to be produced in the glass which are the reverse replica of the matrix of the mold and so treating the mold blank by first cutting the ribs or grooves therein with the cutting tool and thereupon producing an accurate surface contour and subsequently reconditioning and accurately maintaining the configuration of the mold by a special master burnishing tool which likewise accurately conforms in configuration to the exact contour desired to be produced in glass. This will clean, properly surface and burnish the mold in an exact replica thereof and the mold may be quickly, easily and continuously maintained in proper operating condition.

Various other objects are within the scope of this invention such as relate to the arrangement of the related elements or the structure and to various details of construction and to economies of manufacture and numerous other features as will be apparent from a consideration of the drawing and related description of a form of the invention, which may be preferred, in which—

Figure 1 is a plan view of a glass headlight lens produced by the present method and apparatus.

Fig. 2 is a cross section of the lens shown in Figure 1.

Figure 3 is a diagrammatic illustration of a glass mold with the molding matrix illustrated in place on the die.

Figures 4 and 5 represent tools which may be employed in cutting the matrix blank to form a reverse replica thereof and give the proper contour to the matrix.

Figures 6 and 7 represent special burnishing tools which may be manipulated by hand but the burnishing edges of which will accurately maintain the mold in proper configuration during use.

Figures 8 and 9 are side views of the tools illustrated in Figures 4, 5 and 6, 7, respectively.

Figure 10 is a view of a miller cutter in which a plurality of cutting tools are assembled on an arbor to cut a plurality of grooves in the matrix blank in a reverse replica thereof to form the matrix.

Figure 11 is an end view thereof.

Figure 12 is a view similar to Figure 10 showing the special assembly of a burnishing tool.

Figure 13 is an end view thereof.

Figure 14 is an enlarged sectional view of the lens produced by the mold and apparatus disclosed herein, drawn to scale.

Referring to Figure 1, it will be seen that in one application of the present invention I desire to produce a lens having a plurality of zones 10, 11 and 12 of transverse ribs illustrated in Figures 2 and 14 as comprising vertical convex lenses 10', 11' and 12'. The exact contour and configurations of these lenses may correspond to those disclosed in my co-pending application Serial Number 536,024, filed February 13, 1922.

The mold is diagrammatically illustrated in Figure 3 where it is seen that the mold box 15 receives the molten glass and the matrix 16, carried by the plunger 17, is pressed therein to produce in the glass an exact reverse replica of the matrix 16. To produce this matrix from the blank, I employ master tools of the exact correct configuration such as illustrated in Figures 4 and 5, the tool 18 shown in Figure 4 forming the ribs of the zone 10 of the glass and the tool 18' illustrated in Figure 5 forming the ribs of the two zones 11 and 12. It will be noted that the configurations of the cutting edges of these master tools conform exactly to the lens or ribs to be produced in the glass and bring the surface of the blank matrix to a configuration correponding thereto without requiring skillful shaping of each individual rib with an ordinary tool. After the predetermined desired number of ribs are thus formed in the blank, the surface is now treated to accurately finish the same by the use of the master burnishing tools illustrated in Figures 6 and 7. In this way the matrix 16 is given an extremely accurate surface configuration otherwise unobtainable.

In order to accurately maintain this accurate configuration and permit continued use of the mold which scales up in use and otherwise changes its accurate shape, the master burnishing tools are now used to remove scale and impurities and refinish and reshape the matrix of the mold to again give the required configuration thereto.

Illustrated in Figures 10 and 12 is an apparatus for simultaneously cutting a plurality of the ribs of different zones of a glass article and simultaneously burnishing and conditioning the surface of the matrix to maintain very accurately the exact desired configuration of each individual rib of each zone in order to thereby insure a very accurate quantity production of a plurality of glass articles conforming exactly to the mold. Thus, it will be seen that the plurality of burnishing wheels 20 shown in Figure 12 forms a standard or master design to which each glass article shown in Figure 14 thereafter produced by the mold shown in Figure 3 will accurately and uniformly conform. The miller cutters 19 assembled on the arbor 19' in Figure 10 correspond to the construction in my co-pending application, Serial No. 551,645, filed April 11, 1922. The burnishing wheels 20 may be made of any desired burnishing material suitable for properly and very accurately shaping the grooves in the matrix 16, to give their final configuration including of course an abrasive action if desired in refinement of the surface produced by the miller cutters and to likewise be used in removing all scale and impurities and accurately reconditioning the matrix 16 to its desired preconceived configuration as stated.

It will thus be seen that I have provided a method of producing a glass mold by providing a master cutting tool and reciprocating or moving the same transversely across the blank to originally cut the reverse replica of the tool from which the glass may be formed in combination with a similarly formed master burnishing tool reciprocated or transversely moved thereon to thereby add an extremely accurate refinement heretofore impossible in making a suitable glass mold and in maintaining the same in proper condition for use in the production of a large quantity of articles which will very accurately conform to the standard article which it is desired to produce.

It is apparent that, within the spirit of the invention modifications and different arrangements may be made other than as herein disclosed and the present disclosure is illustrative merely; the invention comprehending all variations thereof.

Having thus described my invention, what I desire to secure by United States Letters Patent and claim is:

1. The process of making a mold for producing a glass article which consists in providing a tool whose cutting edge conforms exactly to the positive shape of the surface configuration to be produced in glass, cutting a mold blank to form the reverse replica of said tool in said blank and finishing said blank with a finishing tool whose cutting edge is in exact configuration of a surface to be produced in glass.

2. The process of reconditioning or polishing a mold of the character herein indicated to remove scale and recondition the same which consists in making a finishing tool whose finishing edge conforms exactly to the contour of the molded glass article to be produced by said mold and causing a transverse relative movement between said mold and said tool to shape the mold to an exact reverse replica of said finishing tool.

3. A process of reconditioning or polishing a glass molding matrix having a plurality of glass molding surfaces therein which consists in providing a plurality of burnishing tools, each burnishing tool having an exact configuration of a surface of the glass article to be produced by the mold and moving said tools with respect to said matrix to cause said burnishing tool to burnish the matrix to an exact reverse replica thereof and simultaneously accurately conform each molding surface of said matrix.

4. The process of reconditioning or polishing a mold of the character herein indicated to accurately shape, remove scale and recondition the same which consists in making a master burnishing tool whose burnishing edge conforms exactly to the contour of the molded glass article to be produced by said mold and causing a transverse movement between said mold and said tool to form an exact reverse replica of said tool therein.

5. An apparatus for reconditioning or polishing a mold of the character herein indicated to remove scale and recondition the same, comprising a predesigned accurately formed burnishing tool whose burnishing edge conforms exactly to the contour of the molded glass article to be produced by said mold adapted for transverse movement on said mold to form an exact reverse replica of said tool in the surface of said mold.

6. An apparatus for reconditioning or polishing a glass molding matrix which comprises an arbor, a plurality of separate burnishing tools, each burnishing tool having an exact configuration of a surface of the glass article to be produced by the mold when moved transversely with respect to a matrix blank to cause said burnishing tools to burnish the matrix to an exact reverse replica thereof and simultaneously accurately conform each corelated molding surface of said matrix.

In testimony whereof, I affix my signature.

SAMUEL F. ARBUCKLE.